United States Patent
Rhee (12) 
(10) Patent No.: US 6,601,976 B1
(45) Date of Patent: *Aug. 5, 2003

(54) SNAP ASSEMBLED LIGHT FIXTURE APPARATUS

(75) Inventor: Shin W. Rhee, Northridge, CA (US)

(73) Assignee: Thin-Lite Corporation, Camarillo, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 09/634,155

(22) Filed: Aug. 9, 2000

Related U.S. Application Data (63) Continuation-in-part of application No. 09/545,600, filed on Apr. 7, 2000.

(51) Int. Cl.[7] .............................................. F21V 21/00
(52) U.S. Cl. ..................... 362/374; 362/217; 362/223; 362/225; 362/364; 362/365; 362/490; 362/368; 362/148; 439/239
(58) Field of Search ................................ 362/217, 221, 362/223, 225, 364, 365, 490, 368, 374, 148; 439/239

(56) References Cited

U.S. PATENT DOCUMENTS

| | | | | |
|---|---|---|---|---|
| 2,972,975 A | * | 2/1961 | Schiffer | |
| 3,828,299 A | * | 8/1974 | Johnson et al. | 339/53 |
| 4,338,653 A | * | 7/1982 | Marrero | 362/223 |
| 4,625,267 A | * | 11/1986 | Mikalonis | 362/150 |
| 4,891,737 A | * | 1/1990 | Sqymanek | 362/223 |
| 5,171,085 A | * | 12/1992 | Jaksich | 362/147 |
| 5,469,348 A | * | 11/1995 | Wong | 362/217 |
| 5,743,627 A | * | 4/1998 | Casteel | 362/222 |
| 5,765,939 A | * | 6/1998 | Tanner, Jr. | 362/219 |
| 5,791,764 A | * | 8/1998 | Jaksich | 362/222 |

* cited by examiner

*Primary Examiner*—Sandra O'Shea
*Assistant Examiner*—Jacob Y. Choi
(74) *Attorney, Agent, or Firm*—Fulwider Patton Lee & Utecht (57) ABSTRACT

A rectangular frame having side and end and side walls defining a downwardly opening receiving cavity for receipt upwardly therein of a pan having a laterally outwardly turned marginal flanges which overlie corresponding flanges in the frame and has mated mounting bores for receipt of mounting screws. Retains mounted on the opposite ends of the frame releasably engage the pan to hold it in position in the frame during shipping and storage and prior to mounting thereof.

38 Claims, 7 Drawing Sheets

SNAP ASSEMBLED LIGHT FIXTURE APPARATUS

CROSS-REFERENCE TO RELATED APPLICATIONS

This application is a continuation-in-part of application Ser. No. 09/545,600, filed Apr. 7, 2000 on which this application claims priority under 35 U.S.C. §120.

BACKGROUND OF THE INVENTION

1. Field of the Invention

The present invention relates to light fixtures and more particularly to light fixtures typically used to mount fluorescent tubes.

2. Description of the Prior Art

Direct current, fluorescent light fixtures have become popular for use in various vehicles such as recreational vehicles, boats and long haul truck cabs. Such fixtures typically incorporate a light frame having a border thereabout for overlying the marginal edges of an opening formed for receipt thereof and configured to receive and mount to a pan typically mounting a pair of light tube sockets.

Various different arrangements have been proposed for mounting a light fixture frame to a light pan. It has been common practice that the light pan will be mounted to the support structure defining a recessed opening and the frame then secured to the light pan. An arrangement of this type is shown in U.S. Pat. No. 5,171,085 to Jaksich and assigned to the assignee of the instant application. Such devices, while having substantial commercial success, require separate assembly of the frame and light pan, along with individual fasteners.

Thus there exists a need for a light fixture including a frame and assembly which may be conveniently pre-assembled during the manufacturing process to adequately locate the parts relative to one another with the final securement of the parts taking place at the time of installation. It is desirable that such a light fixture be adaptable for both flush and recessed mounting and that the exposed portion thereof be attractive in appearance.

SUMMARY OF THE INVENTION

The present invention is characterized by a light fixture of the type including a frame having a border for overlying the marginal edges of an opening cut for mounting thereof and including a pan configured with laterally disposed, outwardly flared mounting flanges which overlie mounting flanges on the frame. One or more retainers are interposed between the pan and frame and mounted to one or the other such that the pan may be loosely assembled during manufacture to be loosely held in position on such frame. On installation, the retainers will hold the pan generally in place relative to the frame so that mounting screws may be driven through the pan to mount the apparatus and hold the frame and pan assembled together.

DESCRIPTION OF THE PREFERRED EMBODIMENT

The light fixture apparatus of the present invention has particular utility for use in mounting fluorescent light tubes and is often used in vehicles having D.C. electrical systems, such as recreational vehicles like motor homes, boats and oftentimes in long haul truck cabs, for illuminating the interior thereof, particularly in the sleeping/bunk areas.

Figure 5:
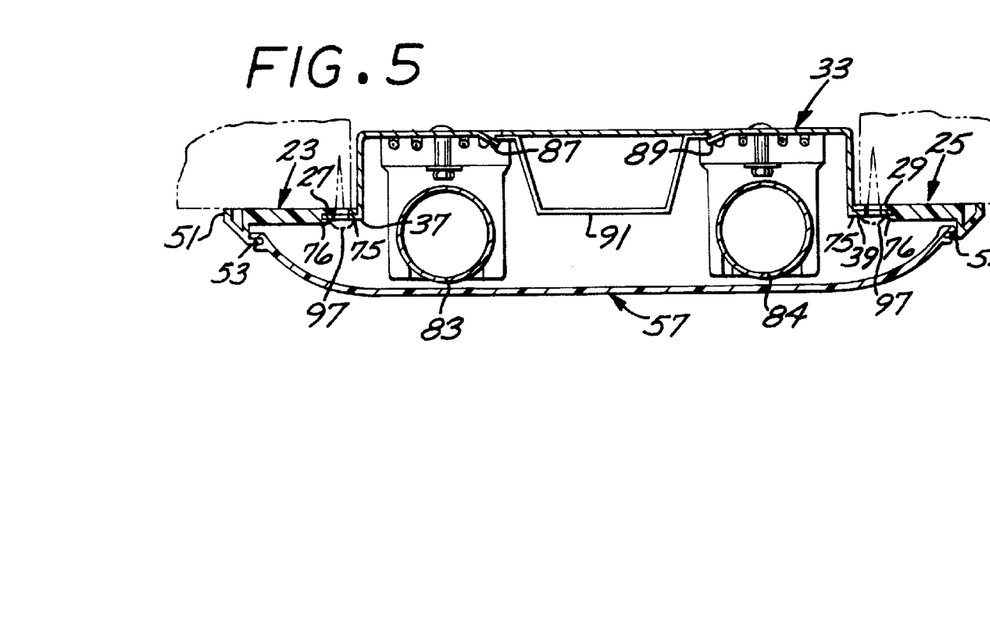
FIG. 5 is a transverse sectional view, in reduced scale, taken along the line 5—5 of FIG. 3.
Figures 7, 8, 9, 10:
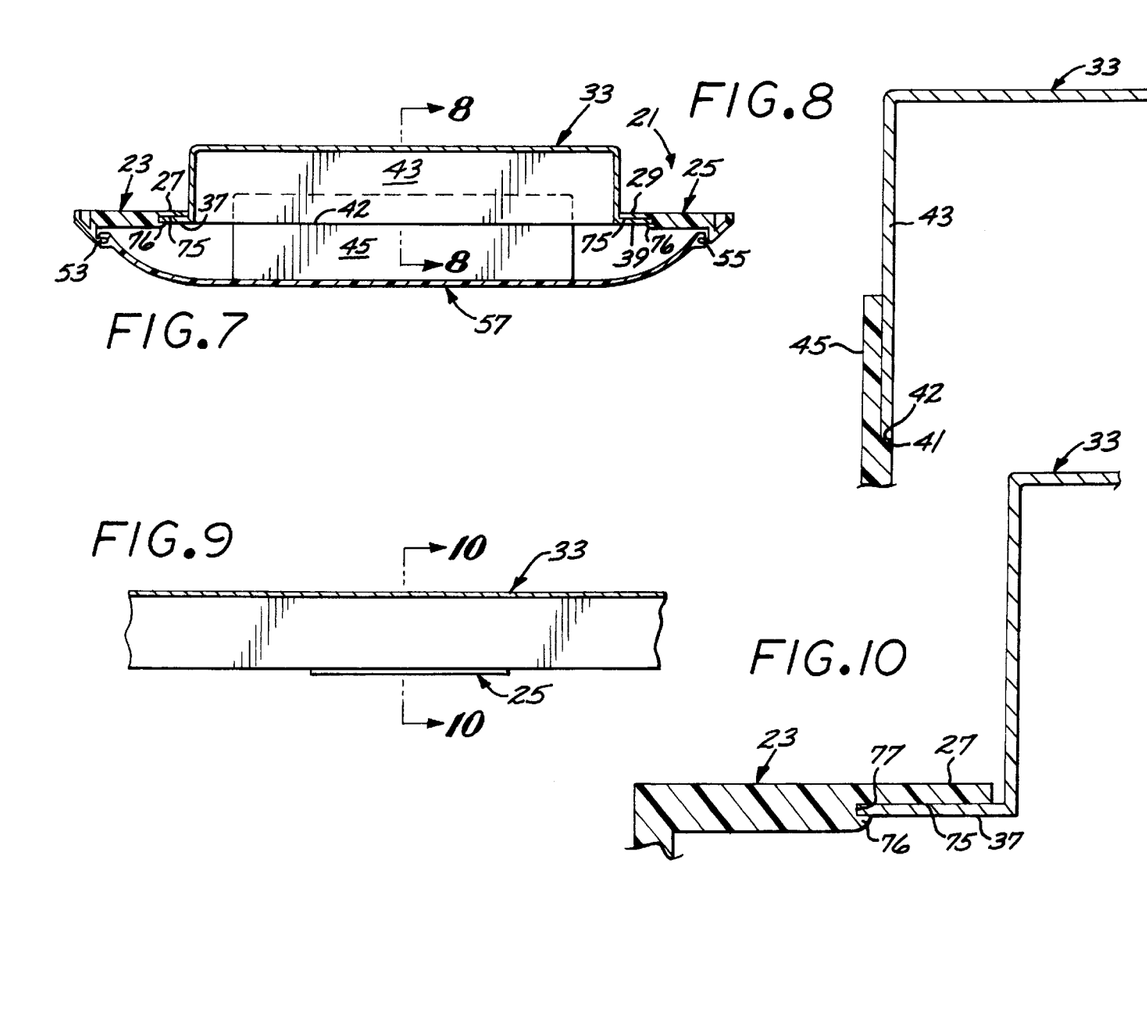
FIG. 7 is a transverse sectional view taken along the line 7—7 of FIG. 4.
FIG. 8 is a vertical sectional view, in enlarged scale, taken along the line 8—8 of FIG. 7.
FIG. 9 is a partial longitudinal sectional view, in enlarged scale, taken along the line 9—9 of FIG. 3.
FIG. 10 is a vertical sectional view, in enlarged scale, taken along the line 10—10 of FIG. 9.
Figure 11:
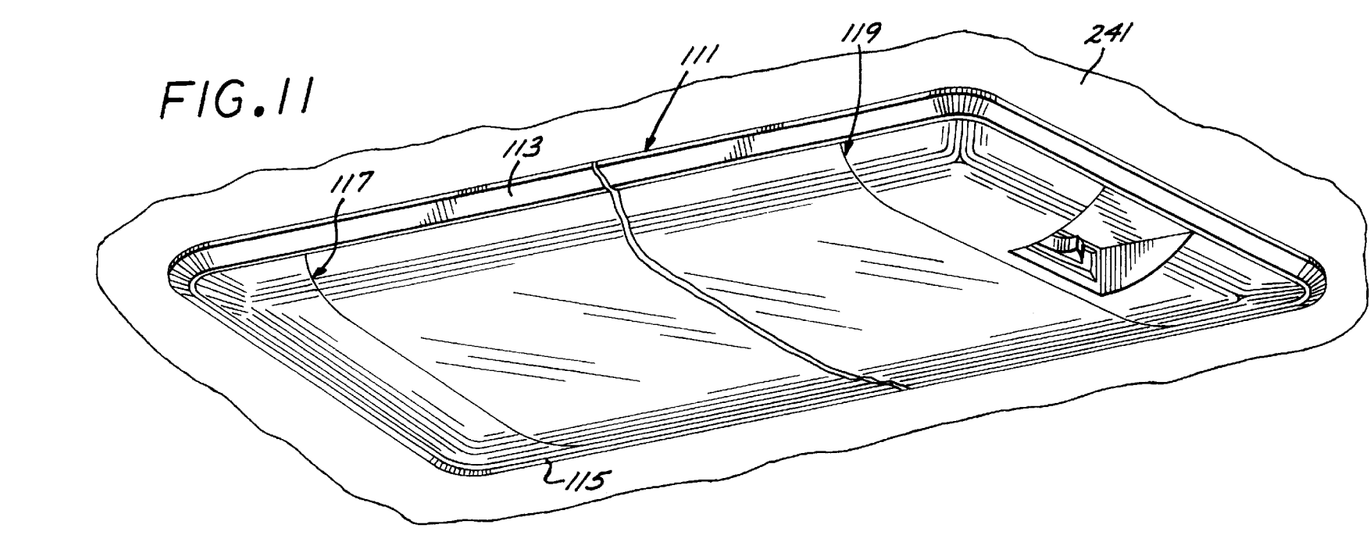
FIG. 11 is a broken bottom perspective view of a second embodiment of the light fixture apparatus of the present invention.
Figure 12:
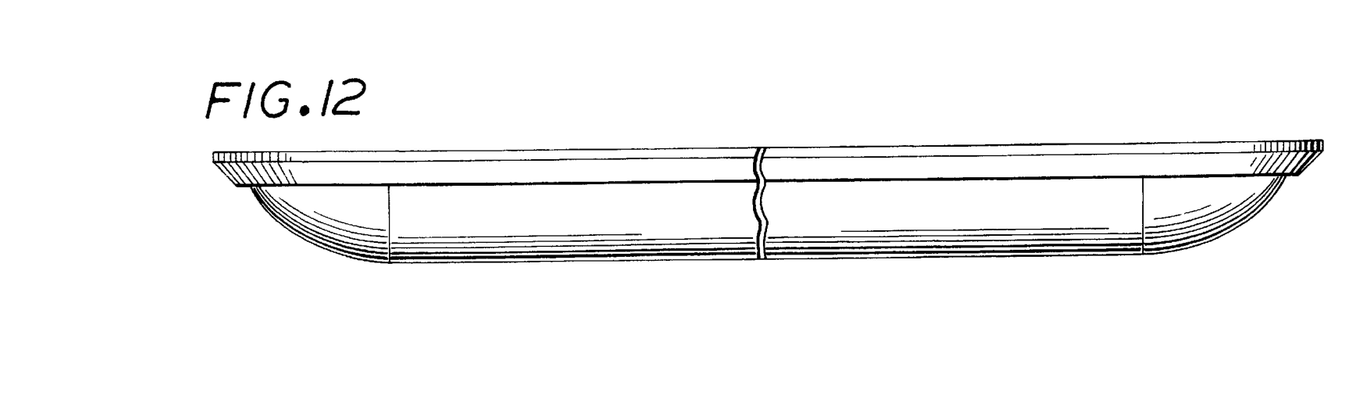
FIG. 12 is a broken front view thereof.

Referring to FIGS. 5 and 7, the light fixture of the present invention includes, generally, a rectangular frame work 21 having laterally disposed side rails 23 and 25 formed with respective inwardly projecting mounting flanges 27 and 29 and cooperating to form a rectangularly shaped, downwardly opening through passage 31 defining a cavity for receipt of a rectangularly shaped light socket mounting pan, generally designated 33 (FIGS. 8 and 10). Formed with such frame side rails are longitudinally spaced inwardly directed retainer clips 76 spaced about 1/16 of an inch below the respective frame flanges 27 and 29 to form inwardly opening notches 77 (FIG. 10). Mounted at one end of the frame 21 is a rocker switch 28. Mounted interiorly on the end of the frame 21 opposite the switch 28 is an end flange 45 undercut to form a horizontally extending upwardly facing retainer shoulder 42 against which the bottom abutment edge 41 of the end wall 43 of the pan 33. The pan 33 is formed plate-like at its top side to define along its laterally opposite sides laterally outwardly turned mounting flanges 37 and 39, respectively, for underlying the respective frame flanges 27 and 29 so their outer edges may be received in the respective notches 77. Thus, in manufacture, the frame 21 and pan 33 may be manufactured separately and loosely assembled together at the manufacturing point by passing such pan 33 upwardly through the opening 31 to engage the pan flanges 37 and 39 underneath the frame flanges 27 and 29. Then, either or both the side rail clips 76 and the end retainer shoulder 42 may be clipped underneath the respective pan flanges 37 and 39 and bottom edge 41 of the pan end wall flange 45, respectively, to loosely maintain such pan 33 and frame 21 assembled during storage and shipping. Upon installation, in the preferred embodiment, the flanges 27,37, and 29 and 39 will be in alignment such that mounting screws 97 (FIG. 5) may be inserted therethrough and driven into the structure surrounding a recessed cavity in, for instance, the top wall of a vehicle to secure such frame and pan together while mounting both against the structural wall.

Figure 1:
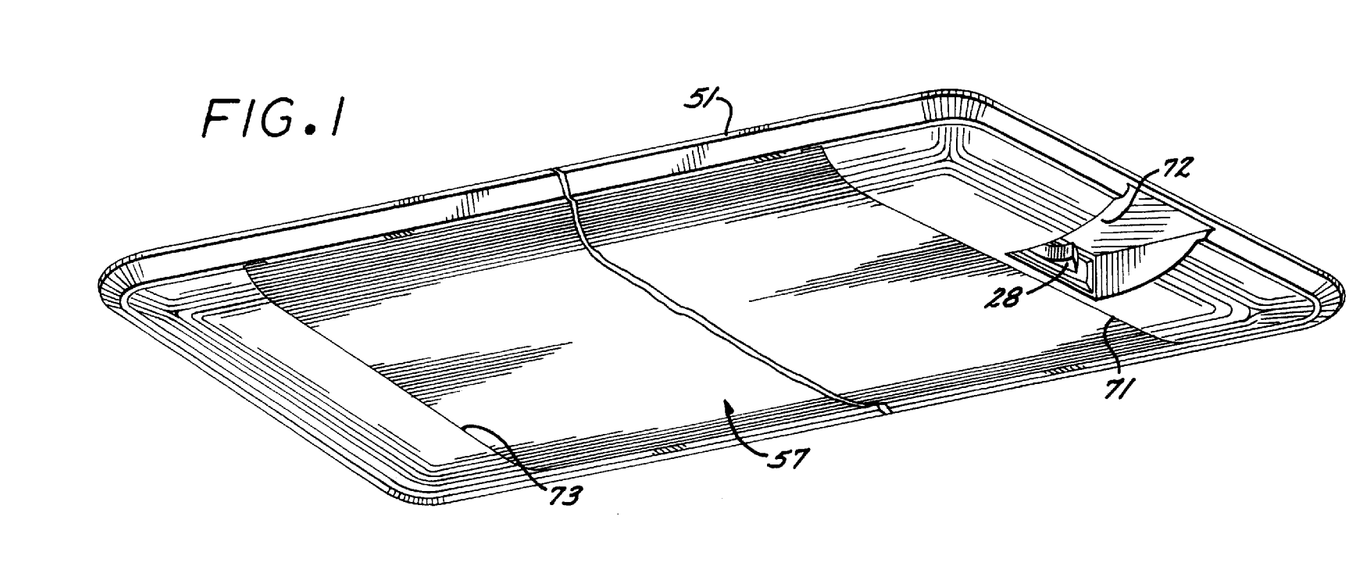
FIG. 1 is a broken bottom perspective view of a snap assembled light fixture apparatus embodying the present invention.
Figure 2:
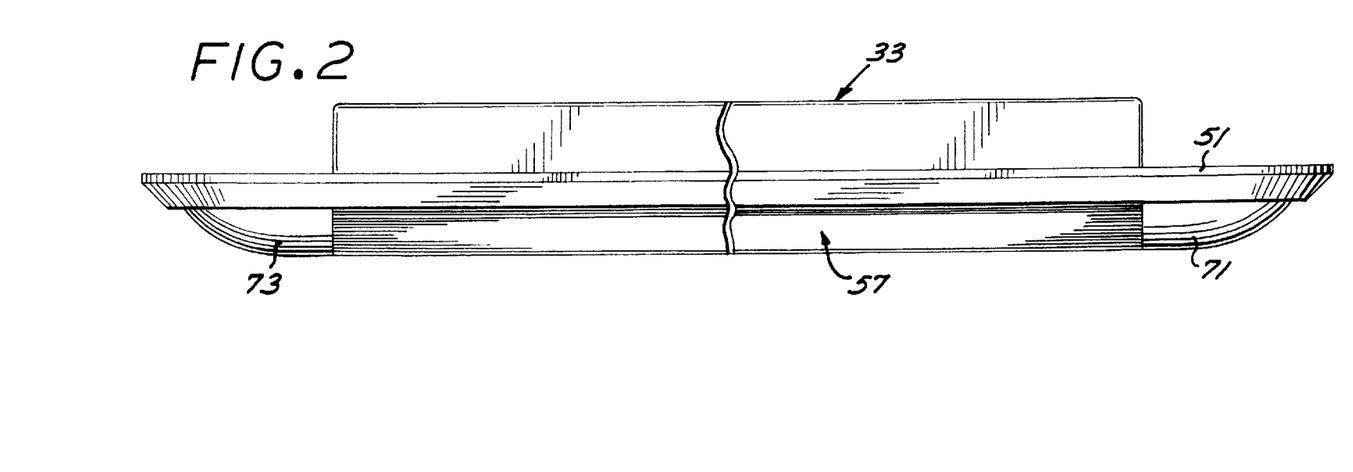
FIG. 2 is a broken front view of the light fixture apparatus shown in FIG. 1.
Figure 3:
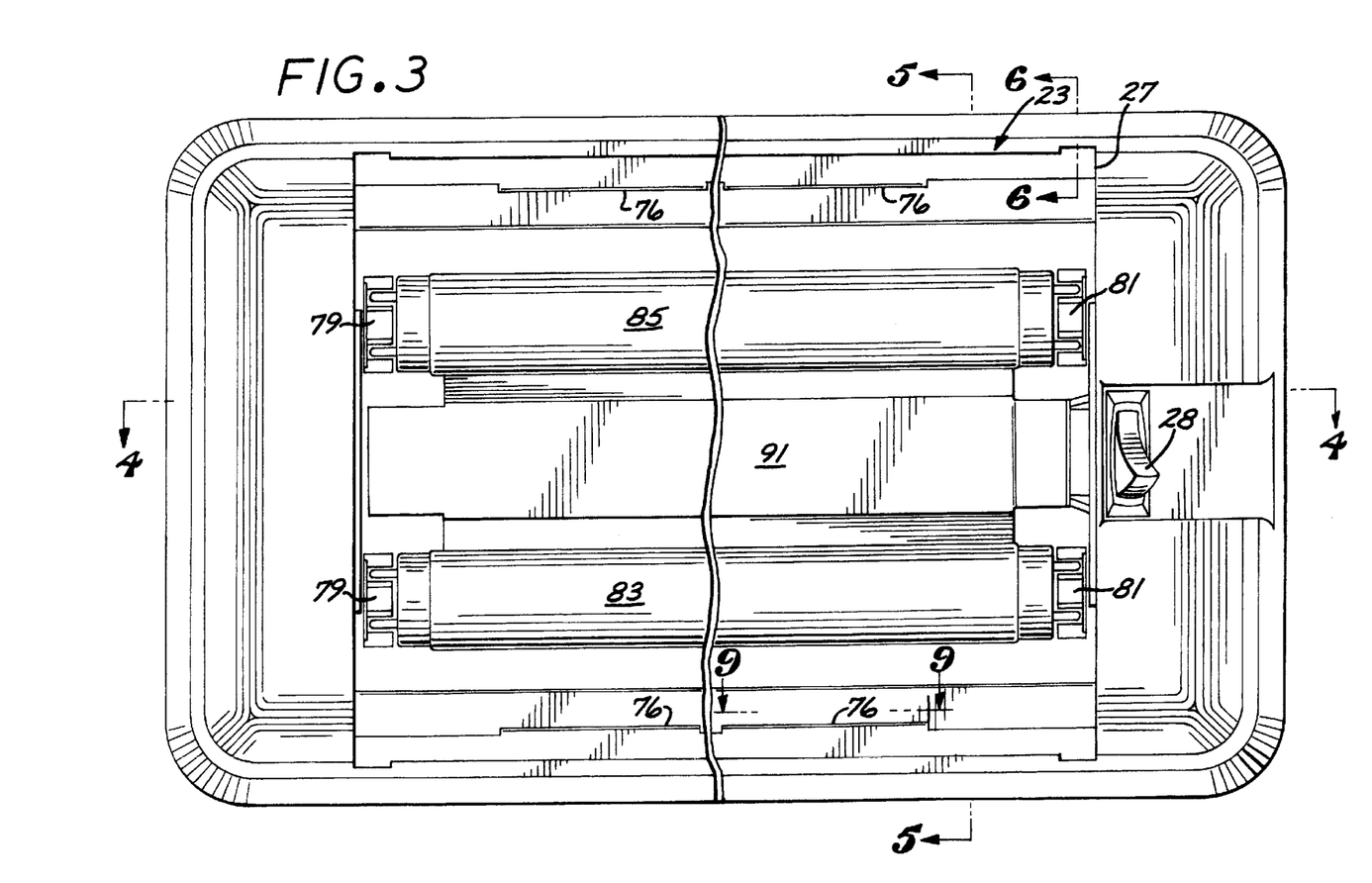
FIG. 3 is a broken bottom view, in enlarged scale, of the light fixture apparatus shown in FIG. 1 but with the lens removed.
Figure 6:
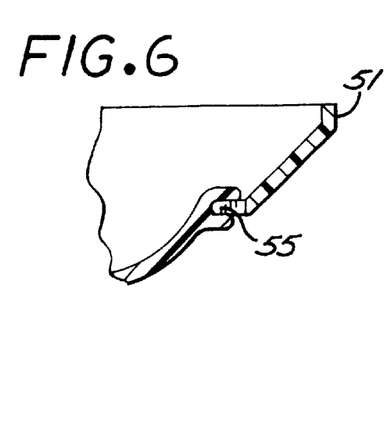
FIG. 6 is a detailed sectional view, in enlarged scale, showing a section of FIG. 5.

The frame 21 may be constructed of any convenient material, such as thin plastic having a thickness of about 5 mm. Such frame, is typically configured with a peripheral border 51 (FIG. 1) sloped downwardly and inwardly to form a bezel around the perimeter thereof. Such frame is configured on the underside along its opposite sides with longitudinal inwardly turned flanges 53 and 55 (FIG. 7) terminating in laterally spaced apart confronting edges to be engaged by the opposite edges of the light lens, generally designated 57 (FIG. 6).

Figure 4:
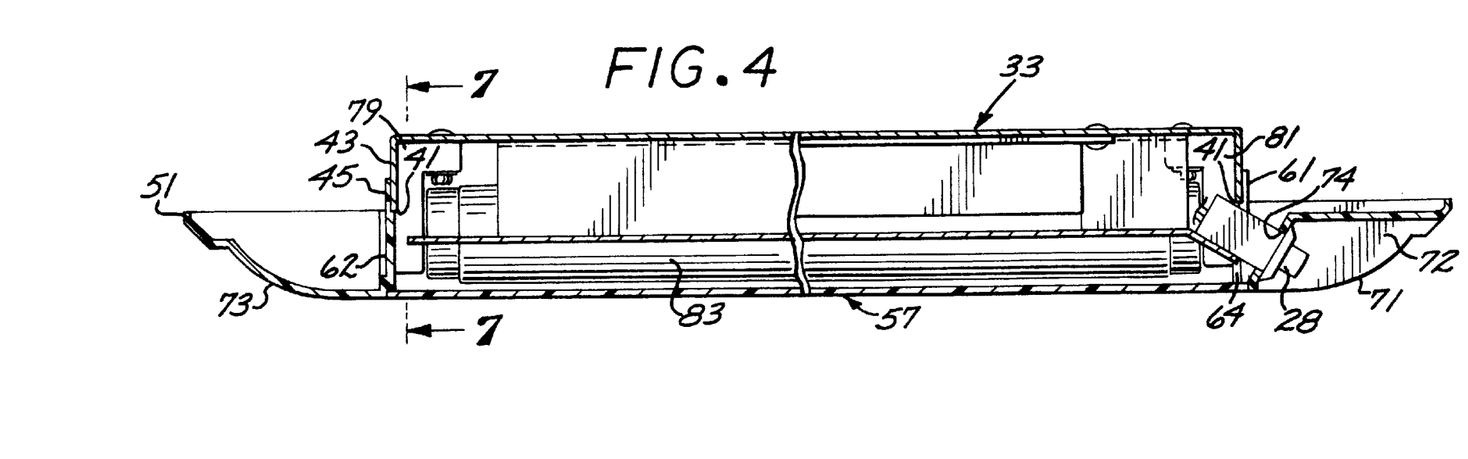
FIG. 4 is a longitudinal broken sectional view, in reduced scale, taken along the line 4—4 of FIG. 3.

The frame 21 may be molded with the oppositely disposed side rails 23 and 25 formed integrally with the co-extensive inwardly projecting side mounting flanges 27 and 29. Such frame is formed with opposite end walls 61 and 62 (FIG. 4). The wall 61 is formed with a pair of laterally spaced apart vertical end pads 64 (FIG. 4) projecting downwardly on opposite sides of the control switch 28 spaced longitudinally from the wall 62 mounting the retainer flange 45 a distance corresponding with the length of the pan 33 to thus trap such pan lengthwise therebetween.

The frame is formed at its opposite extremities with downwardly projecting sculptured hoods 71 and 73 (FIG. 1) which curve upwardly and outwardly at the opposite lateral extremities to form an attractive appearance which compliments the channel shaped configuration of the diffuser lens 57. The hood 71 is formed centrally with a longitudinally outwardly opening, downwardly facing switch recess 72 having its longitudinally inner wall oriented vertically and formed with a through switch window 74 (FIG. 4).

Referring to FIGS. 7 and 10, the frame mounting flanges 27 and 29 are formed at their bottom sides with downwardly facing undercuts 75 for complemental receipt of the respective terminal edges of the flanges 37 and 39. Such undercuts are formed at their lateral outer extremities with the laterally inwardly opening notches 77 defining the respective clips 76 for trapping the lateral outer extremities of the respective pan mounting flanges 37 and 39 therein.

The pan 33 is generally rectangular, box-shape and may be constructed of sheet aluminum and may be formed with the walls thereof being somewhat flexible. Such pan mounts on the underside at the opposite ends thereof (FIGS. 5 and 6) respective longitudinally aligned light sockets, generally designated 79 and 81, for receipt of the opposite terminals of respective fluorescent light tubes 83 and 85. The top wall of the pan 33 is formed with downwardly bent, inwardly inclined bifurcated retaining clips 87 and 89 defining grooves spaced laterally apart for receipt of the opposite edges of a channel shaped ballast cover, generally designated 91 (FIG. 5).

In operation, it will be appreciated that the frame can be molded of thin wall construction so that the thin walls thereof may be highly flexible relative to one another and will define the opening for receipt of the light pan 33. The electronics will be mounted to the interior bottom side of the tray. The frame and pan may then be loosely assembled at the time of manufacture by inserting the body of the pan 33 upwardly into the opening 31 between the flanges 27 and 29, and between the opposite ends of the end walls of such frame. The rails 23 and 25 may be flexed outwardly so that the underhanging clips 76 formed by the undercut notches 77 will clear the laterally outer edges of the respective pan flanges 37 and 39 to allow such flanges to be aligned horizontally with the respective notches 77. It will be appreciated that the frame has sufficient flexibility so that the end wall 62 (FIG. 4) may also be flexed longitudinally outwardly to allow the confronting end wall of the pan 33 to pass upwardly relative thereto to register the bottom edge 41 thereof with the upwardly facing shoulder 42 so that such shoulder will be snapped inwardly by the flex of the end wall to engage under such edge to cooperate in holding the pan in place. Simultaneously, the rails 23 and 25 may then be flexed laterally inwardly to engage the marginal edges of the respective pan flanges with the respective notches 77 above the respective clips 76 and thereby aligning the mounting bores in the respective flanges 27 and 37 and 29 and 39. It will be appreciated that in some embodiments of the present invention only the clips 76 will be incorporated and in others only the retainer flange 45. It only being important that such pan be held temporarily in place on such frame. Typically a two part switch housing will be employed so that after the pan and frame are married together as described the connectors on the switch main housing may be connected to the wire connectors and the switch housing face introduced in the recess 72 to be positioned in the window 74 to snap onto the main housing. The diffuser 57 may then be inserted in place by merely flexing the laterally opposite side walls inwardly and engaging the marginal hanger flanges under the respective lens mounting flanges 55 (FIGS. 6 and 7).

The loosely assembled light fixtures may then be packaged and stored as desired. The packaged fixtures may be shipped in their loosely assembled conditions ready for installation. When a workman desires to install such fixtures, an opening in the overhead wall or the like may be formed to complementally receive the horizontal cross section of the body of the pan 33 upwardly thereinto. It will be appreciated that vertically aligned mounting bores may be preformed at the time of manufacture in the respective flanges 27 and 37 and 29 and 39 for receipt of mounting screws 97 (FIG. 5). Such screws will then serve to hold the pan and frame firmly in its assembled position while holding the assembled fixtures firmly from the overhead wall.

Figure 13:
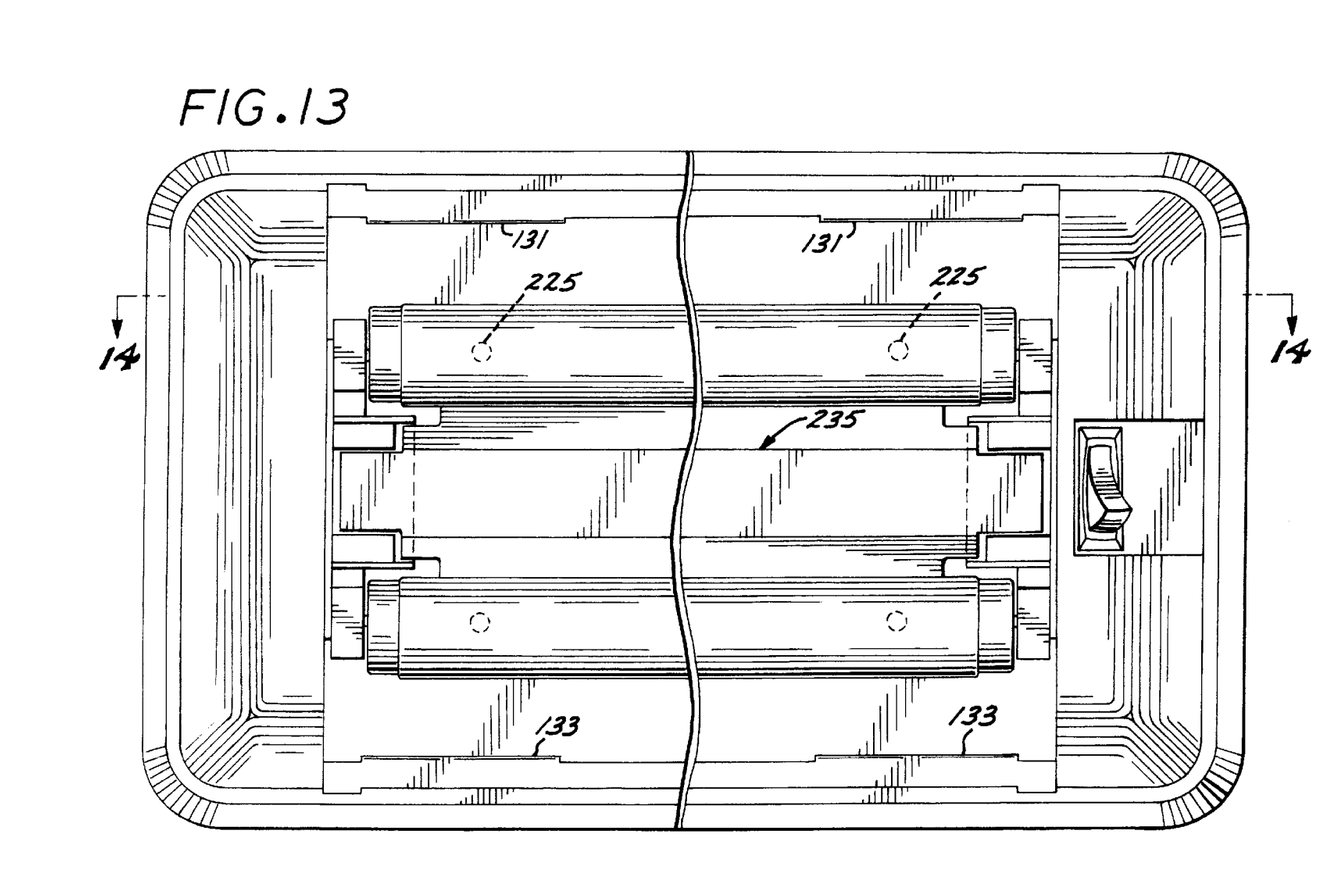
FIG. 13 is a broken bottom view thereof, in enlarged scale, but with the light diffuser removed.
Figure 14:
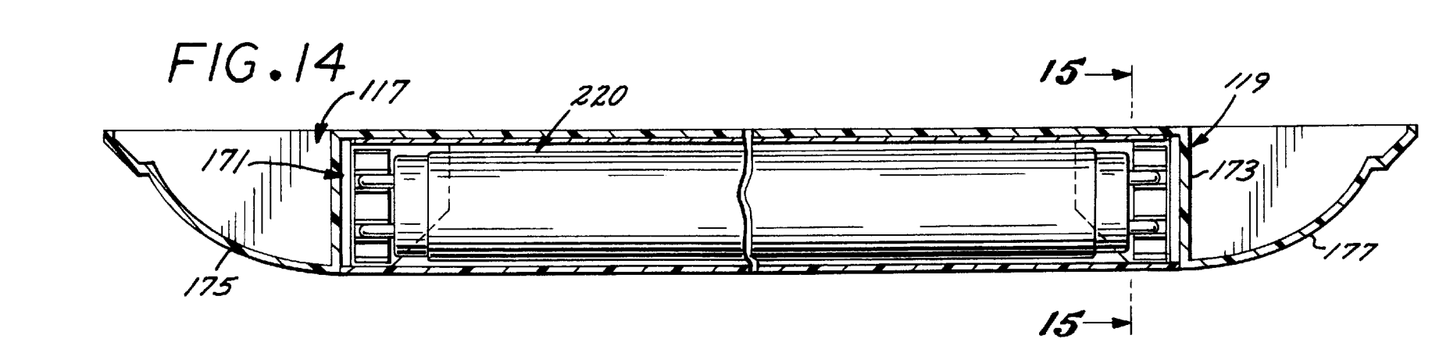
FIG. 14 is a broken longitudinal sectional view thereof taken along the line 14—14 of FIG. 13.
Figures 15, 16:
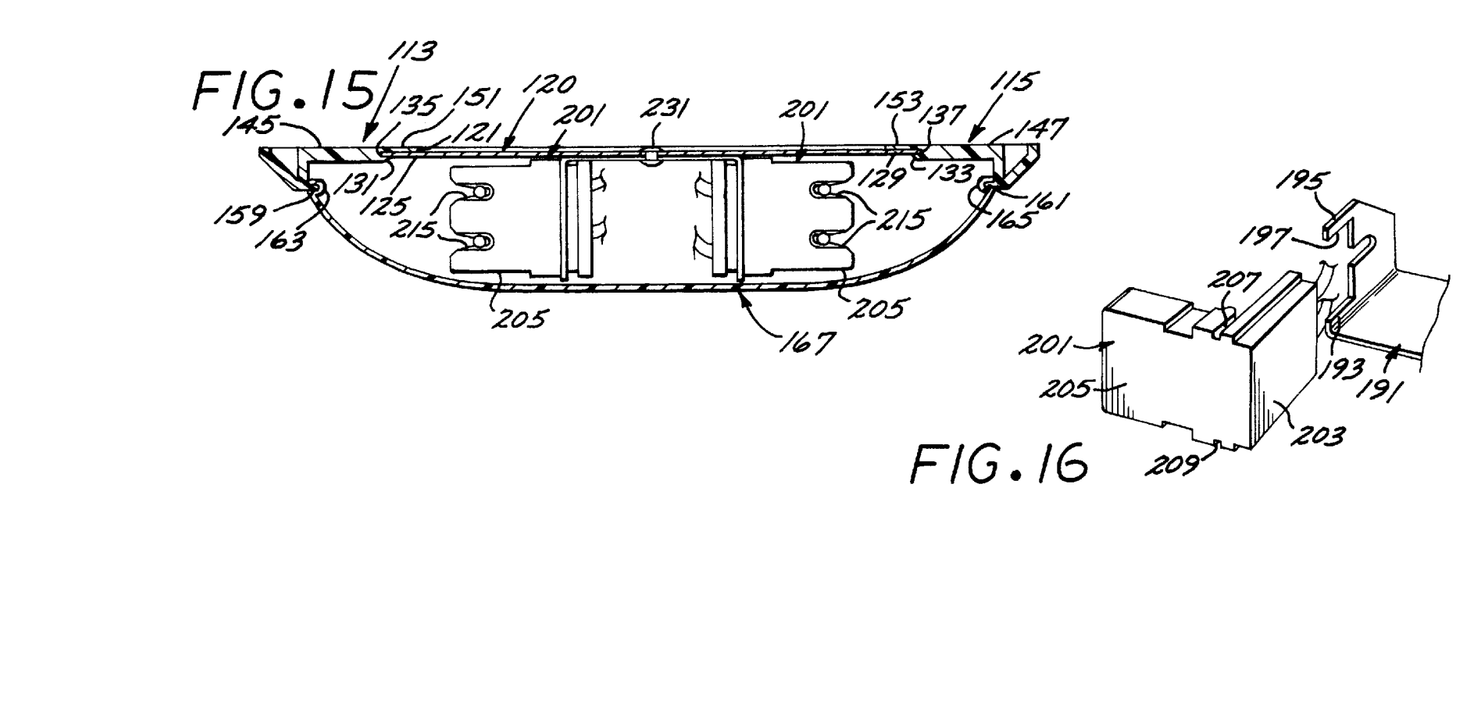
FIG. 15 is a vertical sectional view taken along the line 15—15 of FIG. 14.
FIG. 16 is a detailed perspective view, in enlarged scale, of a mounting bracket utilized to mount terminal blocks incorporated in the apparatus shown in FIG. 11.

The light fixture apparatus shown in FIGS. 11 through 16 is similar to that shown in FIGS. 1–12 and includes, generally, a frame 111 formed with flexible side rails 113 and 115 which cooperate with end walls 117 and 119 to form a rectangular opening 121 (FIG. 15). The rails 113 and 115 are formed with respective downwardly facing recessed nesting surfaces 125 and 129 against which the opposite lateral side strips defined at the edge of a light plate 120 nest.

The rails 113 and 115 are flexible and are formed along the lengths thereof juxtaposed the nesting surfaces 125 and 129 are respective retainers 131 and 133 comparable to the retainers 76 shown in FIG. 7 to form respective notches 135 and 137 for receipt of the opposed edges of such plate.

With continued reference to FIGS. 13–15, the frame is typically constructed of plastic and the rails 113 and 115 are in the form of elongated strips having upwardly facing flat mounting surfaces 145 and 147. The rails are formed on their lateral inner sides with transversely inwardly projecting flat strips 151 and 153 which cooperate in forming the downwardly facing nest surfaces 125 and 129. The respective retainers 131 and 133 are spaced downwardly from the nesting surfaces 125 and 129 a distance equivalent to the thickness of the plate 120. In the preferred embodiment, two such retainers 131 and 133 are formed on each of the flanges 113 and 115 to releasably retain the plate adjacent the opposite ends thereof.

Similar to the construction shown in FIG. 8, the rails 113 and 115 are somewhat C-shaped in vertical cross-section to project downwardly at the lateral outer edges thereof and turn inwardly to form respective lips 159 and 161 which releasably engage in the slots formed by respective outwardly facing hooks 163 and 165 formed by the lateral opposite edges of a light diffuser, generally designated 167.

Referring to FIG. 14, the frame is configured with the opposite end walls 117 and 119 configured with vertical laterally projecting end plates 171 and 173, respectively. The frame is formed at the respective bottom edges of the respective end plates with respective hood walls 175 and 177 which curve longitudinally outwardly and upwardly to form respective bezels which cooperate in shrouding the respective end walls from view below.

Mounted on the underside of the pan plate 120 at the opposite ends thereof are respective channel shaped mounting brackets, generally designated 191 (FIG. 16), which are configured at their lateral opposite sides with vertical plates formed with vertically spaced apart upper and lower legs 193 and 195 which define longitudinally outwardly opening retainer slot 197. Respective L-shaped terminal blocks, generally designated 201, are formed with respective longitudinal legs 203 and transverse legs 205. Formed in the bottom and top edges of such blocks 201 are respective retainer slots 207 and 209 for receipt of the confronting edges of the respective legs 195 and 193 to slidably hold the respective blocks 201 in place trapped between such brackets and the respective end walls plates 171 and 173. The blocks 201 are formed in the respective transverse legs 201 with respective longitudinally inwardly opening and laterally outwardly open ended terminal slots 215 having electrical contact for receipt of the prongs at the end of respective fluorescent light tubes, generally designated 220.

The mounting plate 120 is in the form of a flat planar plate and is typically constructed of aluminum. The plate is formed in the surface thereof, typically concealed above the respective tubes 220, with longitudinally spaced apart mounting bores 225 (FIG. 13) which receive mounting fasteners (not shown) that may be inserted at the time of installation to mount the fixture and hold the pan 120 and frame assembled together.

Thus, it will be apparent that the fixture and pan plate shown in FIGS. 11–16 may be easily assembled at the manufacturing plant. Similar to the apparatus shown in FIGS. 1–10, it will be appreciated that the frame may be conveniently molded of plastic and the plate 120 made separately. The mounting bracket 191 may be riveted to the plate by rivets 231 (FIG. 15) and the wiring assembled thereon. The terminal blocks 201 may be loosely placed in position and the plate 120 nested in place between the respective end wall plates 171 and 173 to engage what eventually becomes the underside of the respective rails 113 and 115. One or the other or both of such rails 113 and/or 115 may be flexed laterally outwardly to shift the lateral inner edge of one or the other of the retainers 131 and 133 laterally outwardly to clear the edge strip of the lateral opposite edges of such plate to align such edges with the respective notches 135 and 137 and such rails or rails released to flex laterally inwardly to thus engage the opposite edges of such plate with such notches to thereby loosely hold the plate 120 temporarily in position. It will be appreciated that a channel shaped way cover, generally designated 235, may be mounted to the underside of the plate in a conventional manner.

With this relatively inexpensive and convenient temporary assembly, the apparatus can be easily stored and shipped. During installation, the apparatus may be conveniently pulled from the shipping container and the parts thereof will be held loosely in position. The apparatus may be mounted flush to a wall without cutting any recess hole or the like therein. That is, the wiring may be drawn through the wall and attached to the wiring mounted on the plate and the plate and apparatus then engaged flush against a wall 241 (FIG. 11) and fastener screws or the like inserted through the mounting bores 225 (FIG. 13) and driven into place to secure the plate against such wall 241 concurrently trapping the flange strips 151 and 153 above the opposite edges of such plate to thus hold the frame also firmly in position.

From the foregoing, it will be appreciated that the light fixture of the present invention is economical and convenient to construct and provides an aesthetically pleasing appearance. The pan may be assembled with the electrical components thereon and may be quickly married with the frame at the time of assembly. The pan will be held in place without the necessity of separate fasteners and can be packaged and shipped without disassembly and disassociation from one another. At the time of installation, the fixture may be conveniently removed from its packaging and the components will be held in place. The pre-assembled fixture may then be positioned in the desired mounting location and fasteners quickly driven through the mounting bores ti firmly secure the assembly together in the mounted position.

From the foregoing, it will be appreciated that the light fixture of the present invention is economical to manufacture, convenient to assemble and will provide a sturdy and long trouble free life.

What is claimed is:

1. Light fixture apparatus comprising:
   an elongated frame including frame end wall members and frame side flange members cooperating to form a downwardly facing pan receiving opening:
   a pan to be advanced upwardly into said opening and including pan end wall elements and pan side flange elements for underlying juxtaposed the respective said frame end wall members and frame side flange members; and
   at least one retainer mounted on one of said members for removably snapping into engaging relation under at least one of the said elements to hold said pan assembled to said frame.

2. Light fixture apparatus as set forth in claim 1 wherein:
   said frame side flange members are formed with mounting bores.

3. Light fixture apparatus as set forth in claim 2 wherein:
   said pan side flange elements are formed with through bores aligned with the respective said mounting bores.

4. Light fixture apparatus as set forth in claim 1 wherein:
   said pan is constructed of metal.

5. Light fixture apparatus as set forth in claim 1 wherein:
   said frame is constructed of thermoplastic.

6. Light fixture apparatus as set forth in claim 1 wherein:
   said pan side flange elements each include a plurality of said retainers.

7. Light fixture apparatus as set forth in claim 1 wherein:
   at least one of said frame side flange members is configured with a laterally inwardly opening undercut forming a notch defining said retainer; and
   said pan side flange elements are configured on their respective lateral outer edges to be complementally received in the respective said notches.

8. Light fixture apparatus as set forth in claim 1 that includes:
retainer plates mounted on said end walls.

9. Light fixture apparatus as set forth in claim 1 that includes:
said retainers mounted on the respective said frame side flange members.

10. Light fixture apparatus as set forth in claim 1 wherein:
said frame side flange members are flexible.

11. Light fixture apparatus as set forth in claim 1 wherein:
said frame end wall members are flexible.

12. Light fixture apparatus as set forth in claim 1 that includes:
respective retainer plates mounted on the inside of said frame end wall members and formed with downwardly facing retainer edges for engaging the bottom edge of said pan.

13. Light fixture apparatus as set forth in claim 12 wherein:
said frame side flange members include laterally inwardly projecting clips to be snapped inwardly under the outer marginal edges of the respective said pan side flange elements.

14. A light fixture for mounting flush to a structural wall and comprising:
an elongated frame including side and end walls configured to form a pan-receiving opening, said side walls including outwardly-turned frame mounting flanges;
a light pan to be received complementally upwardly into said opening of said frame and including laterally projecting pan mounting flanges for engaging under said frame mounting flanges, said pan including on at least one end a downwardly facing abutment edge; and
a retainer mounted on one end wall of said frame in alignment with said abutment edge for engaging said abutment edge to normally hold said pan in place relative to said frame, said retainer being selectively shiftable out of alignment with said abutment edge.

15. The light fixture of claim 14 wherein:
said frame mounting flanges include respective clips configured to releasably engage under said pan mounting flanges.

16. The light fixture of claim 14 wherein:
said pan includes said downwardly facing abutment edges at both ends; and
said frame includes said retainers on both said side end walls in alignment with respective said abutment edges for cooperating in holding; said pan assembled to said frame.

17. The light fixture of claim 14 wherein:
said frame is constructed of plastic.

18. The light fixture of claim 14 wherein:
said frame is configured with at least one of said end walls flexible to provide for relative longitudinal movement between said retainer and said abutment edge to shift said retainer out of alignment with said abutment edge.

19. The light fixture of claim 14 wherein:
at least one of said frame is formed with said side and end walls flexible.

20. The light fixture of claim 16 wherein:
said frame is configured with both said end walls flexible.

21. A method of making a light fixture including:
selecting a flexible frame having frame end wall members and frame side flanges cooperating to form a pan-receiving window, said frame side flanges facing downwardly and including respective downwardly spaced retainer clips cooperating with said frame side flanges to define inwardly opening notches;
selecting a pan mounting light tubes and having outwardly turned pan side flanges for being positioned in underlying relationship beneath said frame side flanges and terminating in laterally outwardly disposed edges removably received in said notches; and
positioning said pan in said window by flexing said frame side flanges laterally outwardly overlying said notches with said edges and releasing said frame side flanges to capture said edges in said notches to loosely assemble said frame and said pan.

22. Flush mount light fixture apparatus comprising:
an elongated frame including frame end walls and first and second resilient frame side flanges having respective downwardly facing first and second nesting surfaces cooperating with said end walls to form an opening;
a pan plate including laterally disposed first and second pan side strips for underlying the respective said frame side flanges; and
at least one retainer mounted on said first frame side flange and spaced therefrom to provide a first notch for receipt of said first side strip so that said plate can be positioned over said opening and said first frame side flange flexed laterally outwardly to allow said retainer to clear said first side strip to allow said first side strip to nest in said first nesting surface so said first frame side flange can flex inwardly to engage said retainer under said first side strip to trap it in said first notch.

23. Light fixture apparatus comprising:
an elongated frame including frame end walls and first and second resilient frame side flanges cooperating with said end walls to form an opening and having respective downwardly facing first and second nesting surfaces;
a pan plate including laterally disposed first and second side strips for underlying the respective said frame side flanges; and
at least one retainer mounted on said first frame side flange and spaced therefrom to provide a first notch for receipt of said first side strip so that said plate can be positioned under said frame confronting said opening and said first frame side flange flexed laterally outwardly to allow said retainer to clear said first side strip to allow said first side strip to nest in said first nesting surface so said first frame side flange can flex inwardly to engage said retainer under said first strip to trap it in said first notch.

24. Light fixture apparatus as set forth in claim 23 wherein:
said plate includes mounting holes for receipt of mounting screws to mount said apparatus to a flat wall surface.

25. Light fixture apparatus as set forth in claim 23 wherein:
said second frame side flange includes a respective second retainer configured to form a laterally inwardly opening second notch for receipt of said second side strip.

26. Light fixture apparatus as set forth in claim 22 wherein:
said end walls are formed with downwardly projecting hoods defining longitudinally inwardly facing abutment walls;

said apparatus includes mounting brackets mounted at the opposite ends of said plate and formed with downwardly projecting clips configured with respective longitudinally projecting legs spaced vertically apart to form an open ended slot;

a pair of terminal blocks at each end of said plate, including longitudinally inwardly opening terminal sockets and including respective housings formed on their respective top and bottom sides with longitudinal open ended slots for receipt of respective edges of the respective said legs; and said blocks being configured with respective end flanges to be trapped between the respective said brackets and the respective said abutment walls.

27. Light fixture apparatus as set forth in claim 26 wherein:

said longitudinal open ended slots are configured to be slip fit over said respective edges of said legs.

28. Light fixture apparatus as set forth in claim 26 wherein:

said blocks are L-shaped to be configured with respective first flanges projecting laterally to form the respective said end flanges and second flanges projecting longitudinally in juxtaposition with the respective said clips.

29. Light fixture apparatus as set forth in claim 26 wherein:

the respective said end flanges include longitudinally open ended sockets and said blocks include electrically conductive terminals mounted in the respective said slots.

30. Light fixture apparatus as set forth in claim 23 wherein:

said frame side flanges are formed on their respective top sides with flat mounting surfaces for abutting against a flat mounting wall;

said plate is channel shaped in vertical cross section to form a pan section projecting upwardly in said opening above the plane including said flat mounting surfaces; and light terminal sockets are mounted in the opposite ends of said pan section.

31. Light fixture apparatus as set forth in claim 30 wherein:

said frame end walls include respective vertical end plates projecting downwardly and said frame further includes respective hoods projecting longitudinally outwardly from the respective said frame end walls and formed with respective bottom walls curving upwardly and longitudinally outwardly from the respective lower extremities of said frame end walls to shroud said frame end walls from viewing from the underside thereof.

32. Light fixture apparatus as set forth in claim 23 wherein:

said pan plate is planar.

33. Light fixture apparatus as set forth in claim 32 for mounting flush to a mounting wall and wherein:

the respective said frame mounting flanges are formed on their respective top sides with flat mounting surfaces disposed in a horizontal plane to set flush against said mounting wall, and said frame mounting flanges and said retainer are configured to orient said plate in a horizontal plane juxtaposed said first mentioned horizontal plane.

34. Light fixture apparatus as set forth in claim 33 that includes:

light terminal blocks mounted on the bottom side of said plate.

35. Light fixture apparatus as set forth in claim 34 wherein:

said plate includes fastener holes for receipt of fasteners to mount said plate to said mounting wall.

36. Light fixture apparatus as set forth in claim 33 wherein:

said frame mounting flanges include lateral outer extremities formed with downwardly projecting borders and respective inwardly turned lens mounting flanges; and a flexible lens diffuser configured for covering said plate and formed at the lateral opposite extremities thereof with respective laterally outwardly opening grooves for receipt of respective said lens mounting flanges.

37. Light fixture apparatus for mounting a light mounting pan plate configured on the opposite sides with first and second side strips, said apparatus comprising:

an elongated frame including longitudinally spaced apart frame end walls and laterally spaced resilient longitudinal frame side flanges cooperating with said frame end walls to form an opening for receipt of said plate and having respective downwardly facing nesting surfaces for nesting upwardly thereagainst of said side strips; and said frame side flanges including respective retainers mounted thereon and configured with respective laterally inwardly opening notches for receipt of respective said side strips of said plate so that said plate may be positioned under said frame and one or the other of said frame side flanges flexed laterally outwardly to provide clearance for confronting said frame side flange to be received in the respective said notches to be releasably held in place by said retainer.

38. Light fixture apparatus as set forth in claim 37 wherein:

said plate includes fastener holes for receipt of fasteners to mount said plate and said fixture to a mounting wall.

* * * * *